United States Patent [19]

Negre

[11] Patent Number: 4,788,945
[45] Date of Patent: Dec. 6, 1988

[54] PROCESS AND APPARATUS FOR CONTROLLING A GAS EVACUATION CIRCUIT OF A ROTATIONAL DISTRIBUTION MOTOR

[76] Inventor: Guy Negre, Les Adrechs, Vinon sur Verdon, France, 83560

[21] Appl. No.: 61,433

[22] PCT Filed: Sep. 24, 1986

[86] PCT No.: PCT/FR86/00323
§ 371 Date: May 21, 1987
§ 102(e) Date: May 21, 1987

[87] PCT Pub. No.: WO87/01762
PCT Pub. Date: Mar. 26, 1987

[30] Foreign Application Priority Data

Sep. 24, 1985 [FR] France ................... 85 14231
Aug. 27, 1986 [FR] France ................... 86 12198

[51] Int. Cl.⁴ .................................. F01L 7/00
[52] U.S. Cl. ...................... 123/80 BA; 123/190 BD
[58] Field of Search ............ 123/80 R, 80 BA, 190 B, 123/190 BB, 190 BD, 323

[56] References Cited

U.S. PATENT DOCUMENTS

| | | | |
|---|---|---|---|
| 1,278,083 | 9/1918 | Force | 123/190 BD |
| 1,595,607 | 8/1926 | Jones | 123/80 R |
| 1,616,030 | 2/1927 | Dock | 123/80 BA |
| 2,989,955 | 6/1961 | Dunne | 123/80 BA |
| 3,526,216 | 9/1970 | Henvaux | 123/190 BB |
| 3,945,359 | 3/1976 | Asaga | 123/190 BA |
| 4,016,840 | 4/1977 | Lockshaw | 123/190 BD |
| 4,116,189 | 9/1978 | Asaga | 123/190 BB |

FOREIGN PATENT DOCUMENTS 0145479 6/1985 European Pat. Off. .
2305600 10/1976 France .
2487 of 1913 United Kingdom .

Primary Examiner—Charles J. Myhre
Assistant Examiner—David A. Okonsky
Attorney, Agent, or Firm—Sandler & Greenblum

[57] ABSTRACT

Method and device for controlling an exhaust gas circuit of a rotary distribution engine, enabling to empty the dead volumes of burnt gases at the top dead center at the end of the exhaust and at the beginning of the intake, through a secondary exhaust conduit maintained under depression conditions or by pressure difference if the engine is fitted with a compressor.

22 Claims, 4 Drawing Sheets

PROCESS AND APPARATUS FOR CONTROLLING A GAS EVACUATION CIRCUIT OF A ROTATIONAL DISTRIBUTION MOTOR

The invention relates to a process and apparatus for controlling a gas evacuation circuit, in particular of an internal combustion motor functioning along a 4 phase cycle having controlled or diesel ignition and equipped with a rotational distributor.

In 4 phase rotational distribution motors and more particularly those provided with a rotational distributor having a single lateral transfer channel assuring both, successively the escape then the admission, while the body of the distributor blocks the combustion chamber during the times of compression and combustion, the transfer channel, at the upper dead point at the end of escape and beginning of admission, is open to the combustion chamber at the end of opening of the escape and at the beginning of opening of the admission, thus forming what has conventionally been called "balance" or "sweeping". It is necessary during this phase (very brief in time) to empty to the maximum the burned gases from the combustion chamber or dead volume (which is true for all types of motors) and in this particular case, the volume of the transfer channel which increases considerably the volume of this "dead volume", all the more that the design of motors leads to a considerable transfer channel volume so as to obtain inlet and escape passage cross sections compatible with a good respiration, proof of good efficiency.

Along these lines, it is not rare to have to form a transfer channel whose volume can reach 10 to 25% of the total volume of the individual cylinder. Furthermore, it is necessary to know that a 4 phase motor operates according to the laws of vibratory movements and that, along the length of the conduits both for admission as well as escape, their diameters or cross sections, the distribution timing (before opening of the admission, after closure of the escape) determine synchronization, rhythmically creating pressures and reducing pressures both at admission as well as during escape. The perfect synchronization is to obtain a maximum reduced pressure or a maximum vacuum during escape and a maximum pressure during admission at the upper dead point while the escape is still open and the admission is already open such that the dead volume is swept and emptied of its burnt gases thus allowing for a better filling of the fresh gas, or working fluid, and a better efficiency of the motor.

In practice this perfect synchronization cannot be obtained except over a very narrow range of rotational speed and one must therefore expect to lose efficiency at other motor rotation speeds, a loss proportional to the value of the dead volume.

Now we have seen that in the case of a rotational distributor having a single lateral transfer channel, this dead volume is much more substantial that than of a conventional motor with valves, and that this loss will be proportionally more substantial even though partially compensated by a better filling, rendering this type of motor more acoustic than conventional motors.

The process according to the invention makes it possible to eliminate this defect, to empty well the dead volume constituted of the volume of the combustion chamber added to the volume of the transfer channel at the upper dead point, and to improve over the entire range of speed the motor efficiency.

The process according to the invention is characterized by the fact that each cylinder is equipped with two distinct escape conduits:

a principal escape conduit operating normally but which will be blocked much earlier in the cycle than normally, substantially before the upper dead point or at the upper dead point such that, no possible back pressure intervenes, following the rotational speeds, to reintroduce the burnt gases in the dead volume constituted by the transfer channel of the distributor and the combustion chamber or prevent the proper emptying of the said dead volume;

a secondary escape circuit which, substantially, during the closure of the principal conduit, will place the dead volume in communication with a conduit or a chamber maintained under vacuum by all appropriate means so as to assure the emptying of the said dead volume, emptying favored by the pressure differences, likewise assuring the starting of admission, thus favoring the filling of the motor; this secondary escape circuit being then blocked before the vacuum in the cylinder becomes more substantial than that existing in the vacuum chamber so as to again avoid the reintroduction of the burnt gases.

The vacuum adapted to aspirate the dead volume can be created by any known means without changing the principal of the invention, either by a vacuum or reduced pressure pump, autonomous or connected to the motor, or by dynamic air inlets positioned at favorable locations on the principal escape circuit, or any other solution allowing for the same result.

The blocking of the system, closure of the principal conduit, opening and closing of the secondary circuit, must take into account the inertia of the gas streams, thus it will be possible to open the secondary conduit before the closure of the principal conduit, closure intervening substantially before the upper dead point.

A plurality of opening and closure apparatus and systems of the second secondary escape circuit can be used without going beyond the principal of the process of the invention.

It will thus be possible to provide:

a conduit directed into the transfer channel of the rotational distributor and opening onto the second secondary escape conduit (in another plane) with its appropriate timings, the opening and the closing being then controlled by the rotational distributor itself;

a small rotational secondary distributor driven by the motor placing in communication at the right moment the secondary escape conduit, positioned here under the principal conduit substantially in the same plane, the opening of the second conduit being controlled by the secondary distributor, the closure by the principal distributor;

any system of slide valves, valves, or other system making it possible to achieve the opening and closure of the second circuit.

According to another embodiment, and particularly in a motor comprising a plurality of cylinders, the secondary escape circuit of a cylinder can be directly connected to a dynamic vacuum tap in the principal escape conduit of another cylinder which will be during the course of escape during the end of escape phase of the first and will create by its flow which is continuous the desired vacuum, the distributor then blocking the second conduit in the same conditions as before, and so on for each cylinder.

In this case, and during the entire duration of the principal escape a portion of the burnt gas will escape through the secondary escape conduit in the principal escape conduit of the other cylinder.

The greater the number of cylinders, the easier it will be to find a cylinder in the escape phase making it possible to achieve the aspiration necessary for the emptying of the dead volume at the right moment.

The process and apparatus described above are likewise applicable when the motor is equipped with an inlet air compressor or further a turbo-compressor.

In the case where the motor is equipped with a compressor of the Roots volumetric type or other system driven mechanically, the air admitted is then at a pressure greater than atmospheric pressure. The difference of pressure between the admission and escape is thus clear, greater upon admission, and the system for placing under vacuum the secondary escape can if desired be eliminated. In the case where the motor is equipped with a turbo-compressor, only the principal escape conduit of each cylinder is connected to the drive turbine of the compressor, the secondary escape conduit functions then as described above and is connected either to a system for placing under vacuum, or in the escape circuit after the turbine such that the greater pressure upon admission favors the emptying of the dead volumes.

Other aims, advantages and characteristics of the invention will appear from this description by way of non-limiting example of several modes of the invention applied to the control of the escape of a motor functioning along a 4 phase cycle, made with reference to the annexed drawings where:

FIG. 1 schematically shows, seen in transverse cross section at the upper end point of escape and at the beginning of admission a 4 phase motor in which, according to the invention, the secondary escape circuit is controlled by the rotational distributor;

FIGS. 2-3-4 schematically illustrate the respective positions of the elements of this same apparatus: during the escape phase FIG. 2; end of principal escape and beginning of secondary escape, FIG. 3; closure of secondary escape FIG. 4;

Figure 7:
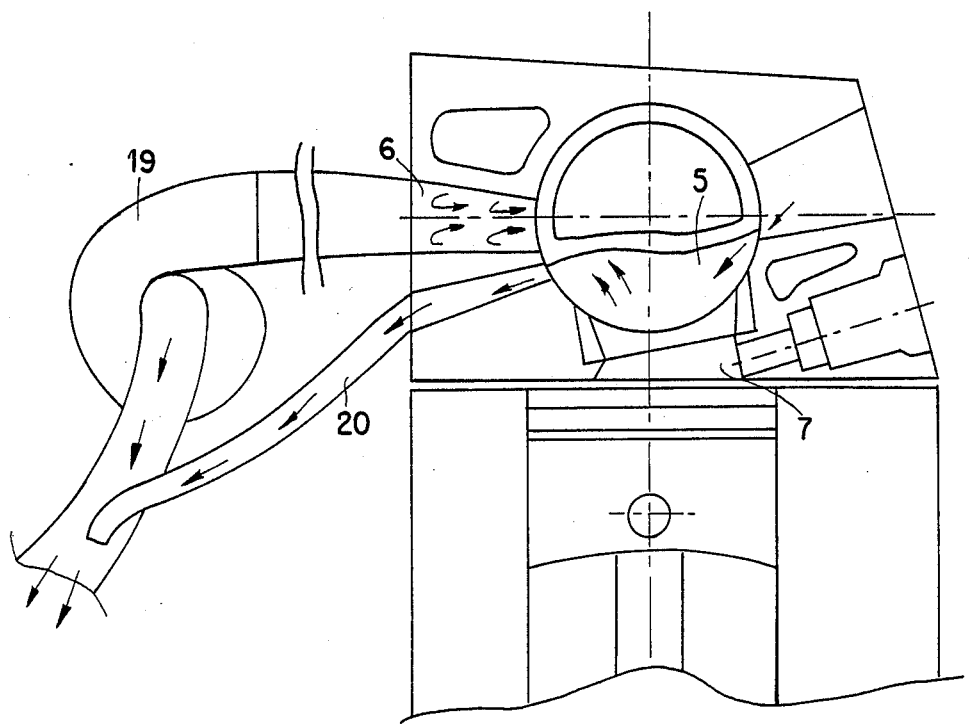

FIG. 7 schematically illustrates at the upper dead point of end of escape and of beginning of inlet, seen in transverse cross section, an alternative process according to the invention in which the motor is equipped with a turbo-compressor.

The motor shown schematically in FIGS. 1-2-3-4 comprises well known elements in rotational distributor motors, operating according to a 4 phase cycle. A piston 1, sliding in a sleeve 2 is capped by a cylinder head 3 in which is driven, at half speed of the motor, a rotational distributor 4, having single transfer channel 5, which during its rotation (direction of the arrow) will place successively in communication the escape conduit 6 and the combustion chamber 7 so as to assure the escape time, then subsequently the combustion chamber 7 with the admission 8 thus assuring the admission time, the body of the rotational distributor 4 blocking the combustion chamber during the times of compression and combustion, the sealing being assured by the sliding element 9.

Figure 1:
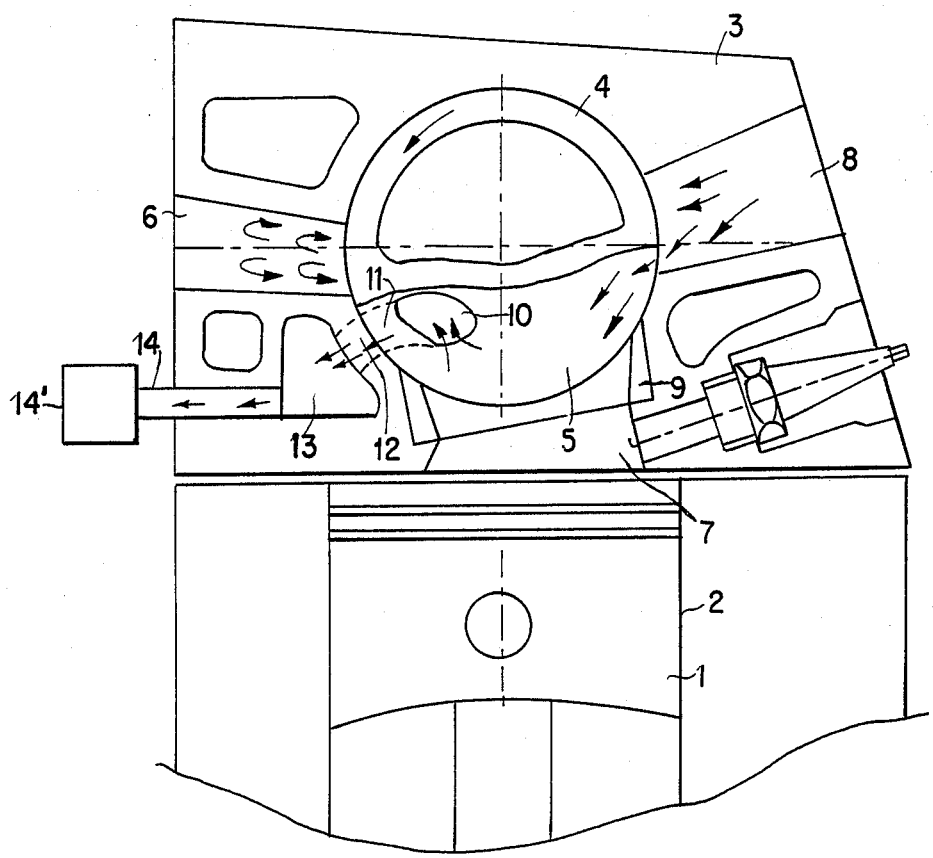

FIG. 1 illustrates the motor at the upper dead point while the principal escape conduit 6 has just been blocked such that no back-pressure causes the burnt gases to be reintroduced into the dead volume constituted by the transfer channel 5 of the distributor, a lateral orifice 10 makes it possible, by means of a conduit 11 bored in the distributor on a plane other than that of the transfer channel 5 and a conduit 12 bored facing the cylinder head 3, to place in communication the dead volume 5 and 7 with a chamber 13 connected by channel 14 to an apparatus 14 creating a reduced pressure. During the time of rotation when conduits 11 and 12 are in alignment, the burnt gases contained in volume 5 and 7 will escape by virtue of the difference of pressure towards chamber 13 and conduit 14, likewise initiating the fresh inlet gas through conduit 8. The positioning and the dimensions of conduits 11 and 12 allow for the adjustment and timing of the opening and closing of the secondary escape conduit. During the closure of the secondary escape circuit the bore of the cylinder head 3 blocks conduit 11 while reciprocally, the distributor body 4 blocks conduit 12. A complementary sealing apparatus can be applied for this purpose.

This being the case, the advantages of the process as well as the above apparatus are understood.

Figure 2:
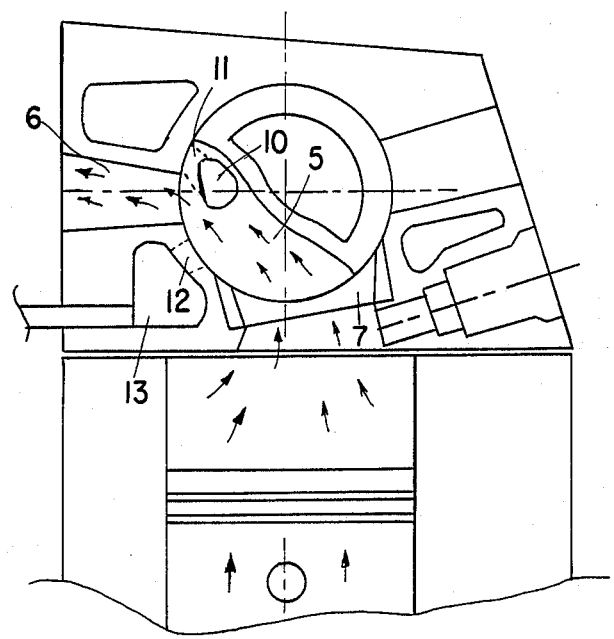
Figure 3:
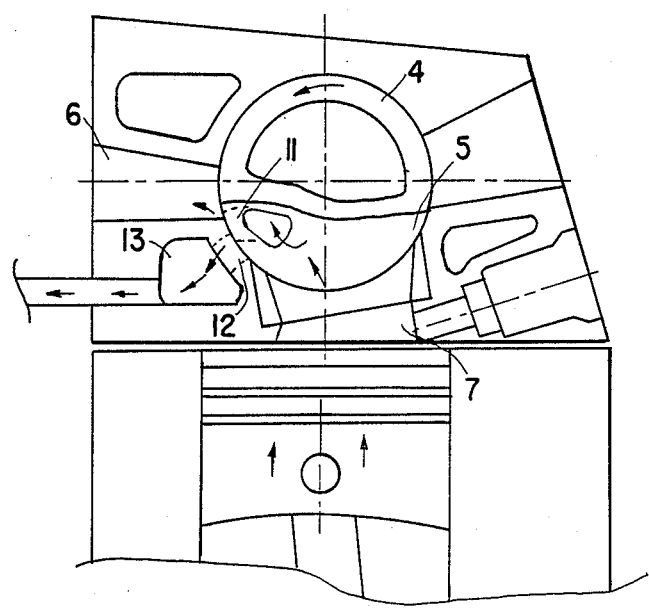

Escape occurs normally, FIG. 2, through principal escape conduit 6. The secondary escape conduit, constituted by orifice 10 and conduits 11 and 12 is blocked. Before a back pressure to the escape during undesirable rotation speeds causes the burnt gases to be reintroduced in the transfer channel 5 and the combustion chamber 7, or to prevent the proper evacuation of the burnt gases, though substantially before the upper dead point, FIG. 3, the distributor body 4 blocks escape conduit 6 while the secondary escape circuit opens by a synchronization of conduits 11 and 12, allowing for the reduced pressure which exists in chamber 13 to end the escape and to draw the volume of burnt gas contained in chamber 7 and channel 5.

The operation continues at the upper dead point, FIG. 1, the reduced pressure initiating further the beginning of the admission of the fresh gas which progressively replaces the burnt gas in the dead volume constituted by the transfer channel 5 and the combustion chamber 7.

Figure 4:
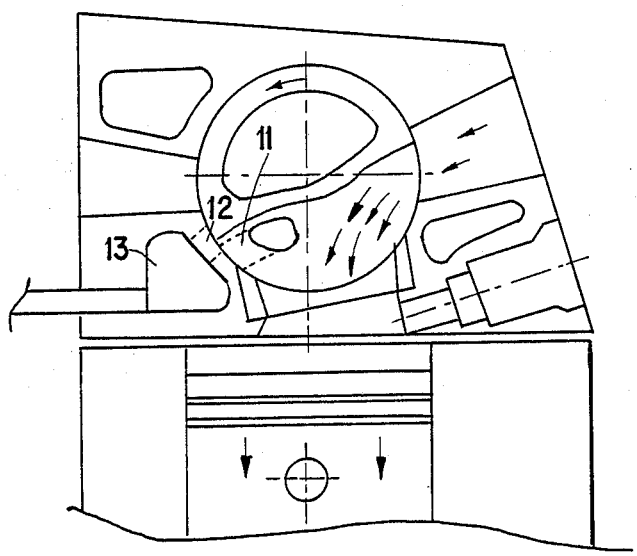

Several degrees after the upper dead point, FIG. 4, while the piston 1 begins its descent, conduits 11 and 12 of the secondary escape circuit no longer coinciding, the secondary circuit is blocked and the admission continues normally. The closure of the secondary circuit must intervene before the reduced pressure exerted by the piston in its descent is greater than that which exists in volume 13.

Figure 5:
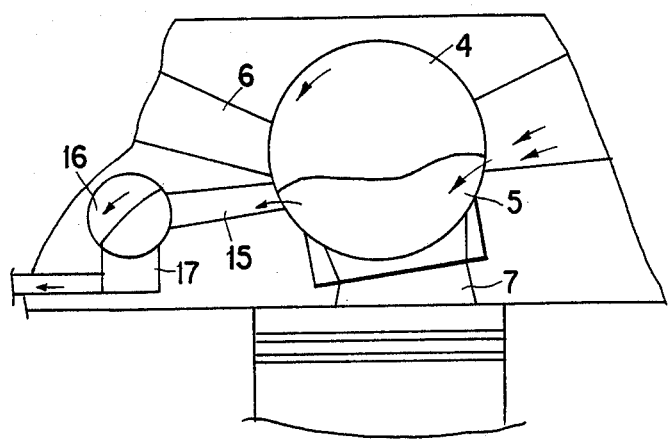
FIG. 5 illustrates at the upper dead point, in transverse cross section, another embodiment according to the invention in which the secondary escape conduit, substantially in the same plane as the principal conduit, positioned in the cycle after the latter, sees in particular its opening controlled by a secondary rotational distributor.

FIG. 5 schematically illustrates, in transverse cross section at the upper dead point, another embodiment of the process which is object of the invention.

The secondary circuit, here formed in the same plane as the transfer channel, is characterized by a conduit 15 opening on the one hand into the bore of the distributor and on the other hand positioned after the escape conduit 6 in the direction of rotation of the distributor. The opening of the second circuit is controlled by a secondary distributor 16 driven by the motor placing in communication the volume 5 plus 7 with a volume 17 at reduced pressure.

In this case it is the principal distributor 4 which assures both the closure of the principal escape 6 then the secondary escape 15 depending upon the timing selected. The principal of operation is identical to that described previously. The secondary rotational distributor can be replaced by a drawer or valve, or any other means producing the same effect.

Figure 6:
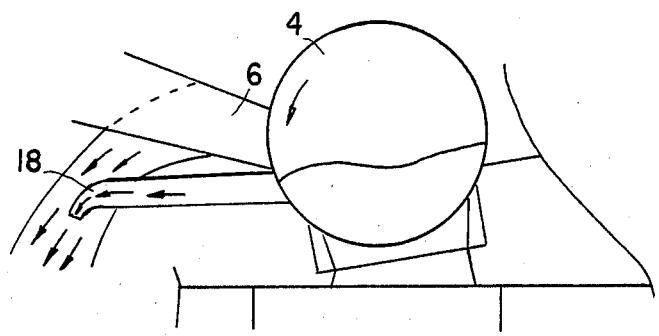
FIG. 6 illustrates at the upper dead point a transverse cross section of a motor comprising a plurality of cylinders, 4 cycle, equipped with a rotational distributor having two escape conduits, according to the invention, and in which the secondary conduit is connected directly to a dynamic vacuum tap in the principal conduit of the escape of another cylinder.

In the case of a motor comprising a plurality of cylinders, and according to another embodiment FIG. 6, the secondary escape conduit of a cylinder is placed in communication with a dynamic reduced pressure tap 18 positioned in the escape flow of another cylinder in the escape phase when the principal conduit of the first cylinder is blocked and this until the closure of the secondary circuit of this same cylinder. In this case, the secondary conduit is open during the escape time and a portion of the escape of the cylinder concerned occurs in the principal conduit of the other cylinder.

According to another alternative of the process and apparatus according to the invention FIG. 7 where the motor is equipped with a turbo-compressor, the principal escape 6 is directly connected to the drive turbine of the turbo-compressor 19 while the secondary escape 20, here positioned in the same plane as the transfer channel 5 and the principal escape conduit 6, is connected to the principal escape after the turbo-compressor.

This being the case, one understands the advantages of this arrangement in which the secondary escape undergoes no back pressure and is either under slight reduced pressure due to the flow of the escaping gas stream after the turbo, or at atmospheric pressure, while the inlet air is compressed at pressures greater than the atmospheric pressure thus favoring the flow in the secondary escape conduit and the proper emptying of the dead volumes. The secondary escape 20 remains open during the entire period of evacuation of the gases.

However, it is possible to utilize a secondary rotational distributor such as described in FIG. 5, or other drawer so as to block the secondary circuit during the opening of the principal circuit, without going beyond the principal of operation.

Of course, the invention is not limited to the embodiments described and shown, and it is susceptible to numerous variations evident to one of skill in the art without going beyond the scope of the invention. Likewise it can be envisioned to apply it to a valve motor, in this case, the two escape circuits will be controlled by distinct escape valves.

What is claimed is:

1. An engine comprising at least one cylinder and means for both supplying a working fluid to said at least one cylinder and allowing it to escape from said at least one cylinder, said means comprising a cylinder head having, for each of said at least one cylinder, an intake circuit, a first escape circuit, a second escape circuit, and a rotary valve for successively opening communication between said cylinder and each of said intake circuit, said first escape circuit, and said second escape circuit, said second escape circuit being in communication with said cylinder after said first escape circuit has closed and remaining open for a period of time allowing said intake circuit to begin simultaneous communication with said cylinder.

2. An engine according to claim 1, wherein said rotary valve is adapted to rotate about an axis substantially perpendicular to a central cylinder axis.

3. An engine comprising at least one combustion chamber and means for both supplying a working fluid to said at least one combustion chamber and, after combustion, allowing it to escape from said at least one combustion chamber, said means comprising a cylinder head having an intake circuit, a first escape circuit, a second escape circuit, and a valve for successively opening communication between said combustion chamber and each of said intake circuit, said first escape circuit, and said second escape circuit, said engine further comprising a cylinder communicating with said combustion chamber, and a piston for reciprocation within said cylinder, said second escape circuit being in communication with said cylinder after said first escape circuit has closed and adapted to remain open until said piston is displaced substantially to a position within said cylinder such that a pressure is created within said cylinder which is less than that of said second escape circuit.

4. An engine according to claim 3, wherein said piston is adapted to be positioned within said cylinder at an upper dead point, and wherein said valve is adapted to close communication between said combustion chamber and said first escape circuit before said piston reaches said upper dead point.

5. An engine according to claim 3, wherein said second escape circuit is in communication with a pressure reduction means for placing said second escape circuit at a pressure less than said combustion chamber when said second escape circuit is in communication with said combustion chamber.

6. An engine according to claim 5, further comprising a plurality of cylinders and respective pistons, intake circuits, first escape circuits, and second escape circuits, wherein said pressure reduction means comprises a dynamic tap in communication with said second escape circuit of one of said plurality of cylinders and said first escape circuit of another of said plurality of cylinders.

7. An engine according to claim 3, wherein said valve is a rotary valve comprising a transfer channel for transferring said working fluid therethrough.

8. An engine according to claim 3, wherein said second escape circuit comprising a conduit having a first end in communication with said valve, and a second end in communication with a second valve.

9. An engine according to claim 8, wherein said valve and said second valve are each rotary valves having respective transfer channels for transferring said working fluid therethrough.

10. An engine according to claim 3, further comprising an inlet air compressor or turbo-compressor having an outlet and an inlet, said inlet in communication with said first escape circuit, wherein said second escape circuit is in communication with said outlet.

11. An engine according to claim 3, wherein said valve comprises a rotation distributor having a transfer channel, lying in a first plane, for providing said opening communication, a lateral orifice communicating with said transfer channel, lying in a second plane, and a first conduit communicating with said lateral orifice.

12. An engine according to claim 11, wherein said second escape circuit comprises a second conduit located in said cylinder head adapted for communication with said first conduit of said rotation distributor.

13. A process using the engine of claim 3, wherein said piston reciprocates within said cylinder to and from an upper dead point adjacent said combustion chamber, said process comprising closing communication between said combustion chamber and said first escape circuit while said piston is moving toward said upper dead point, but before said piston reaches said upper dead point.

14. A process according to claim 13, further comprising opening communication between said combustion chamber and said second escape circuit before closing communication between said combustion chamber and said first escape circuit.

15. A process according to claim 14, further comprising reducing air pressure within said second escape circuit to withdraw said working fluid from said combustion chamber when said combustion chamber is in open communication with said second escape circuit.

16. A process using the engine of claim 3, comprising opening communication between said combustion chamber and said intake circuit while communication between said combustion chamber and said second escape circuit is open.

17. A process according to claim 16, wherein communication between said combustion chamber and said second escape circuit is closed while said piston is moving away from said upper dead point and is substantially at a position within said cylinder such that a pressure is created within said cylinder which is less than that of said second escape circuit.

18. A process using the engine of claim 3, comprising opening communication between said first escape circuit before opening communication between said combustion chamber and said second escape circuit, while closing communication between said combustion chamber and said intake circuit.

19. A process using the engine of claim 3, wherein said engine comprises a plurality of cylinders having respective combustion chambers, intake circuits, first escape circuits, and second escape circuits, and a dynamic tap opening communication between a second escape circuit of a first cylinder and a first escape circuit of at least another of said plurality of cylinders, said process further comprising establishing a reduced pressure in said second escape circuit of said first cylinder by opening communication of said combustion chamber of said another of said plurality of cylinders and said first escape circuit of said another of said plurality of cylinders.

20. A process using the engine of claim 8, comprising maintaining said second escape circuit blocked by means of said second valve while said combustion chamber is in open communication with said first escape circuit, and unblocking said second escape circuit substantially upon closing communication between said combustion chamber and said first escape circuit.

21. An engine comprising at least one combustion chamber and means for both supplying a working fluid to said at least one combustion chamber and, after combustion, allowing it to escape from said at least one combustion chamber, said means comprising a cylinder head having an intake circuit, a first escape circuit, a second escape circuit, and a valve for successively opening communication between said combustion chamber and each of said intake circuit, said first escape circuit, and said second escape circuit, said engine further comprising a cylinder communicating with said combustion chamber, and a piston for reciprocation within said cylinder to and from an upper dead point at which said piston is adjacent said combustion chamber, said valve adapted to close communication between said combustion chamber and said first escape circuit before said piston reaches said upper dead point within said cylinder.

22. An engine according to claim 21, wherein said valve is a rotary valve.

* * * * *